United States Patent
Sumcad et al.

(10) Patent No.: US 8,082,095 B2
(45) Date of Patent: Dec. 20, 2011

(54) ENHANCED PASSENGER PICKUP VIA TELEMATICS SYNCHRONIZATION

(75) Inventors: Anthony J. Sumcad, Southfield, MI (US); Russell A. Patenaude, Macomb Township, MI (US)

(73) Assignee: General Motors LLC, Detroit, MI (US)

( * ) Notice: Subject to any disclaimer, the term of this patent is extended or adjusted under 35 U.S.C. 154(b) by 610 days.

(21) Appl. No.: 12/209,837

(22) Filed: Sep. 12, 2008

(65) Prior Publication Data

US 2010/0070168 A1 Mar. 18, 2010

(51) Int. Cl.
G06F 19/00 (2006.01)
G06G 7/70 (2006.01)

(52) U.S. Cl. .................. 701/206; 701/201; 701/207

(58) Field of Classification Search .................. 701/201, 701/205–213
See application file for complete search history.

(56) References Cited

U.S. PATENT DOCUMENTS 6,535,743 B1 * 3/2003 Kennedy et al. ........... 455/456.1

OTHER PUBLICATIONS

SuperShuttle, www.supershuttle.com, Jun. 14, 2007, p. 1-15.*

* cited by examiner

*Primary Examiner* — Gerald J. O'Connor
*Assistant Examiner* — Sind Phongsvirajati
(74) *Attorney, Agent, or Firm* — Leydig, Voit & Mayer, Ltd.

(57) ABSTRACT

A system is provided for facilitating passenger pickup via telematic routing. The system includes a call center for receiving a plurality of data feeds indicative of passenger arrival time and location, a vehicle telematics unit for receiving vehicle routing instructions from the call center based at least in part on the passenger arrival time and location, the vehicle routing instructions directed to guiding a vehicle to a passenger meeting location. The system further includes a mobile device associated with the passenger, the mobile device in communication with the call center via one or more wireless networks for receiving an indicator of the passenger meeting location.

13 Claims, 4 Drawing Sheets

ENHANCED PASSENGER PICKUP VIA TELEMATICS SYNCHRONIZATION

FIELD OF THE INVENTION

This invention relates generally to the field of telematics and more specifically to synchronizing passenger pickup via telematic routing services.

BACKGROUND OF THE INVENTION

A growing number of modern vehicles incorporate telematics devices for providing navigational assistance in a mobile environment. As part of providing navigational assistance, a vehicle telematics unit typically correlates road network data with the vehicle's current location and conveys vehicle's location information and/or driving directions to the driver via a user interface.

While aiding the driver by providing routing assistance to the desired destination, conventional telematics services are limited by only assisting the driver. In a multi-party meeting scenario, for example when two or more parties need to be routed to a common meeting point, conventional telematics services guide each party independently and do not offer synchronized routing. For example, while picking up an arriving passenger at an airport, a driver is routed to the airport location, however it is up to the driver to determine which temporary parking area (e.g., a cell phone waiting area) has available parking space and is closest to the passenger's baggage claim area. Busy dynamics of large airports with multiple terminals, baggage claim areas, and waiting areas may force a driver to look for available temporary parking in multiple waiting areas, thereby making passenger pickup difficult. Likewise, the arriving passenger may have difficulty tracking the waiting area in which the pickup vehicle eventually finds available space.

BRIEF SUMMARY OF THE INVENTION

A system and method are provided for synchronizing passenger pickup via telematic routing services, where the system call center coordinates vehicle routing with passenger arrival, selects the most available vehicle waiting area based upon a plurality of conditions (e.g., availability of temporary parking, local traffic conditions, baggage delay, proximity to passenger's baggage claim area, among others), and notifies both the driver and the passenger of selected vehicle waiting area and of each other's arrival.

In one aspect of the invention, a system is provided for facilitating passenger pickup via telematic routing, the system comprising (a) a call center for receiving a plurality of data feeds indicative of passenger arrival time and location, (b) a vehicle telematics unit for receiving vehicle routing instructions from the call center based at least in part on the passenger arrival time and location, the vehicle routing instructions directed to guiding a vehicle to a passenger meeting location, and (c) a mobile device associated with the passenger, the mobile device in communication with the call center via one or more wireless networks for receiving an indicator of the passenger meeting location.

DETAILED DESCRIPTION

Figure 1:
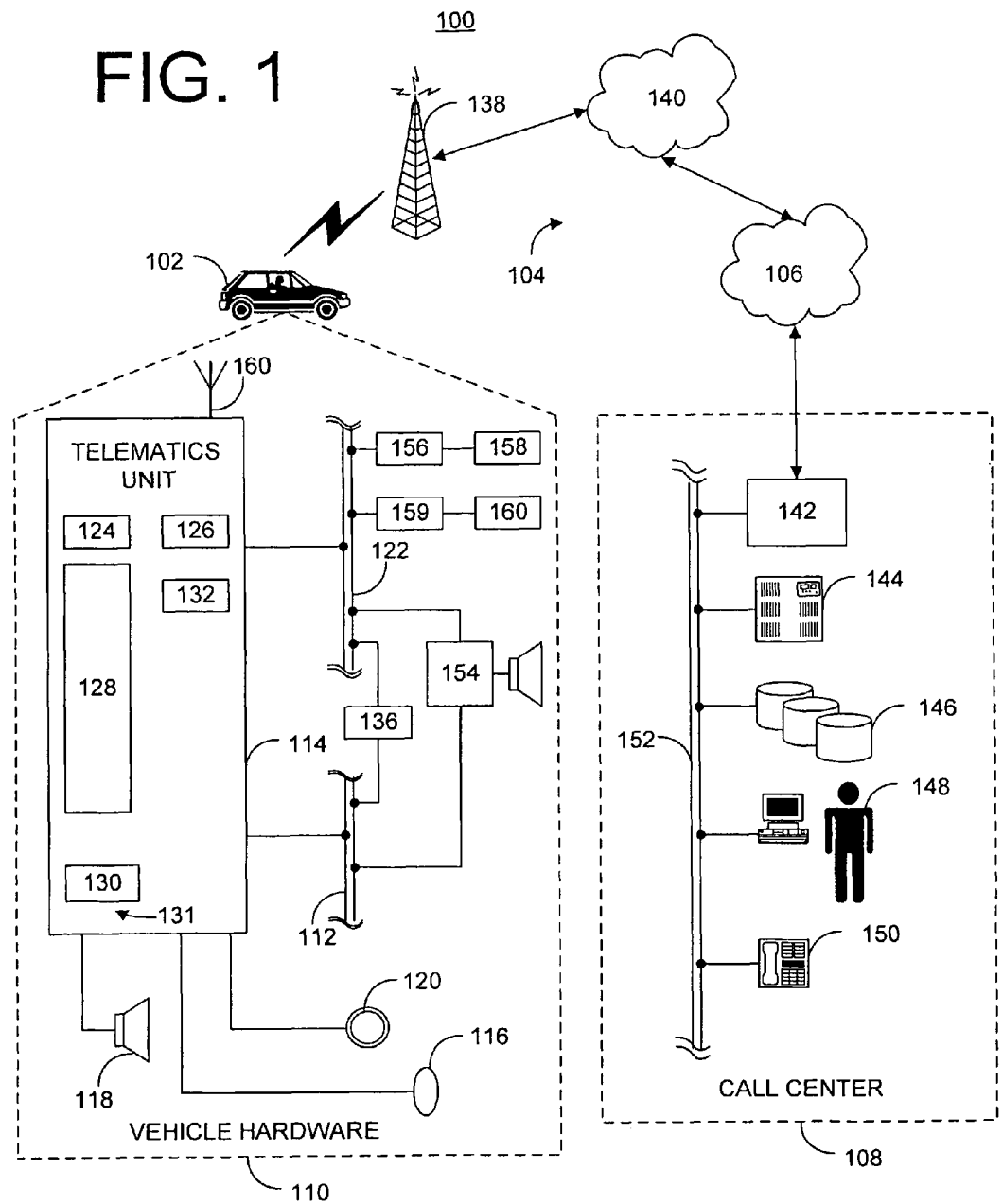
FIG. 1 is a schematic diagram illustrating a system for delivery of in-vehicle telematics services, as contemplated by an example of the present invention.

With reference to FIG. 1 there is shown an example of a communication system 100 that may be used with the present method and generally includes a vehicle 102, a wireless carrier system 104, a land network 106 and a call center 108. It should be appreciated that the overall architecture, setup and operation, as well as the individual components of a system such as that shown here are generally known in the art. Thus, the following paragraphs simply provide a brief overview of one such exemplary information system 100, however, other systems not shown here could employ the present method as well.

Vehicle 102 is preferably a mobile vehicle such as a motorcycle, car, truck, recreational vehicle (RV), boat, plane, etc., and is equipped with suitable hardware and software that enables it to communicate over system 100. Some of the vehicle hardware 110 is shown generally in FIG. 1 including a telematics unit 114, a microphone 116, a speaker 118 and buttons and/or controls 120 connected to the telematics unit 114. Operatively coupled to the telematics unit 114 is a network connection or vehicle bus 122. Examples of suitable network connections include a controller area network (CAN), a media oriented system transfer (MOST), a local interconnection network (LIN), an Ethernet, and other appropriate connections such as those that conform with known ISO, SAE, and IEEE standards and specifications, to name a few.

The telematics unit 114 is an onboard device that provides a variety of services through its communication with the call center 108, and generally includes an electronic processing device 128, one or more types of electronic memory 130 having stored thereon software 131, a cellular chipset/component 124, a wireless modem 126, a dual antenna 160 and a navigation unit containing a GPS chipset/component 132. In one example, the wireless modem 126 is comprised of a computer program and/or set of software routines executing within processing device 128.

The telematics unit 114 provides too many services to list them all, but several examples include: turn-by-turn directions and other navigation-related services provided in conjunction with the GPS based chipset/component 132; airbag deployment notification and other emergency or roadside assistance-related services provided in connection with various crash and or collision sensor interface modules 156 and sensors 158 located throughout the vehicle. Infotainment-related services where music, Web pages, movies, television programs, videogames and/or other content is downloaded by an infotainment center 136 operatively connected to the telematics unit 114 via vehicle bus 122 and audio bus 112. In one example, downloaded content is stored for current or later playback.

Again, the above-listed services are by no means an exhaustive list of all the capabilities of telematics unit 114, as should be appreciated by those skilled in the art, but are simply an illustration of some of the services that the telematics unit is capable of offering. It is anticipated that telematics unit 114 will include a number of known components in addition to those listed above.

Vehicle communications preferably use radio transmissions to establish a voice channel with wireless carrier system 104 so that both voice and data transmissions can be sent and received over the voice channel. Vehicle communications are enabled via the cellular chipset/component 124 for voice communications and a wireless modem 126 for data transmission. In order to enable successful data transmission over the voice channel, wireless modem 126 applies some type of encoding or modulation to convert the digital data so that it can communicate through a vocoder or speech codec incorporated in the cellular chipset/component 124. Any suitable encoding or modulation technique that provides an acceptable data rate and bit error can be used with the present method. Dual mode antenna 160 services the GPS chipset/component and the cellular chipset/component.

Microphone 116 provides the driver or other vehicle occupant with a means for inputting verbal or other auditory commands, and can be equipped with an embedded voice processing unit utilizing a human/machine interface (HMI) technology known in the art. Conversely, speaker 118 provides verbal output to the vehicle occupants and can be either a stand-alone speaker specifically dedicated for use with the telematics unit 114 or can be part of a vehicle audio component 154. In either event, microphone 116 and speaker 118 enable vehicle hardware 110 and call center 108 to communicate with the occupants through audible speech. The vehicle hardware also includes one or more buttons or controls 120 for enabling a vehicle occupant to activate or engage one or more of the vehicle hardware components 110. For example, one of the buttons 120 can be an electronic push-button used to initiate voice communication with call center 108 (whether it be a live advisor 148 or an automated call response system). In another example, one of the buttons 120 can be used to initiate emergency services.

The audio component 154 is operatively connected to the vehicle bus 122 and the audio bus 112. The audio component 154 receives analog information, rendering it as sound, via the audio bus 112. Digital information is received via the vehicle bus 122. The audio component 154 provides AM and FM radio, CD, DVD, and multimedia functionality independent of the infotainment center 136. Audio component 154 may contain a speaker system, or may utilize speaker 118 via arbitration on vehicle bus 122 and/or audio bus 112.

The vehicle crash and/or collision detection sensor interface 156 are operatively connected to the vehicle bus 122. The crash sensors 158 provide information to the telematics unit via the crash and/or collision detection sensor interface 156 regarding the severity of a vehicle collision, such as the angle of impact and the amount of force sustained.

Vehicle sensors 159, connected to various sensor interface modules 134 are operatively connected to the vehicle bus 122. Examples of vehicle sensors include but are not limited to gyroscopes, accelerometers, magnetometers, emission detection and/or control sensors, and the like. Example sensor interface modules 134 include powertrain control, climate control, and body control, to name but a few.

Wireless carrier system 104 is preferably a cellular telephone system or any other suitable wireless system that transmits signals between the vehicle hardware 110 and land network 106. According to an example, wireless carrier system 104 includes one or more cell towers 138, base stations and/or mobile switching centers (MSCs) 140, as well as any other networking components required to connect the wireless system 104 with land network 106. As appreciated by those skilled in the art, various cell tower/base station/MSC arrangements are possible and could be used with wireless system 104. For example, a base station and a cell tower could be co-located at the same site or they could be remotely located, and a single base station could be coupled to various cell towers or various base stations could be coupled with a single MSC, to name but a few of the possible arrangements. Preferably, a speech codec or vocoder is incorporated in one or more of the base stations, but depending on the particular architecture of the wireless network, it could be incorporated within a Mobile Switching Center or some other network components as well.

Land network 106 can be a conventional land-based telecommunications network that is connected to one or more landline telephones and connects wireless carrier network 104 to call center 108. For example, land network 106 can include a public switched telephone network (PSTN) and/or an Internet protocol (IP) network, as is appreciated by those skilled in the art. Of course, one or more segments of the land network 106 can be implemented in the form of a standard wired network, a fiber of other optical network, a cable network, other wireless networks such as wireless local networks (WLANs) or networks providing broadband wireless access (BWA), or any combination thereof.

Call center 108 is designed to provide the vehicle hardware 110 with a number of different system back-end functions and, according to the example shown here, generally includes one or more switches 142, servers 144, databases 146, live advisors 148, as well as a variety of other telecommunication and computer equipment 150 that is known to those skilled in the art. These various call center components are preferably coupled to one another via a network connection or bus 152, such as the one previously described in connection with the vehicle hardware 110. Switch 142, which can be a private branch exchange (PBX) switch, routes incoming signals so that voice transmissions are usually sent to either the live advisor 148 or an automated response system, and data transmissions are passed on to a modem or other piece of equipment 150 for demodulation and further signal processing. The modem 150 preferably includes an encoder, as previously explained, and can be connected to various devices such as a server 144 and database 146. For example, database 146 could be designed to store subscriber profile records, subscriber behavioral patterns, or any other pertinent subscriber information. Although the illustrated example has been described as it would be used in conjunction with a manned call center 108, it will be appreciated that the call center 108 can be any central or remote facility, manned or unmanned, mobile or fixed, to or from which it is desirable to exchange voice and data.

Figure 2:
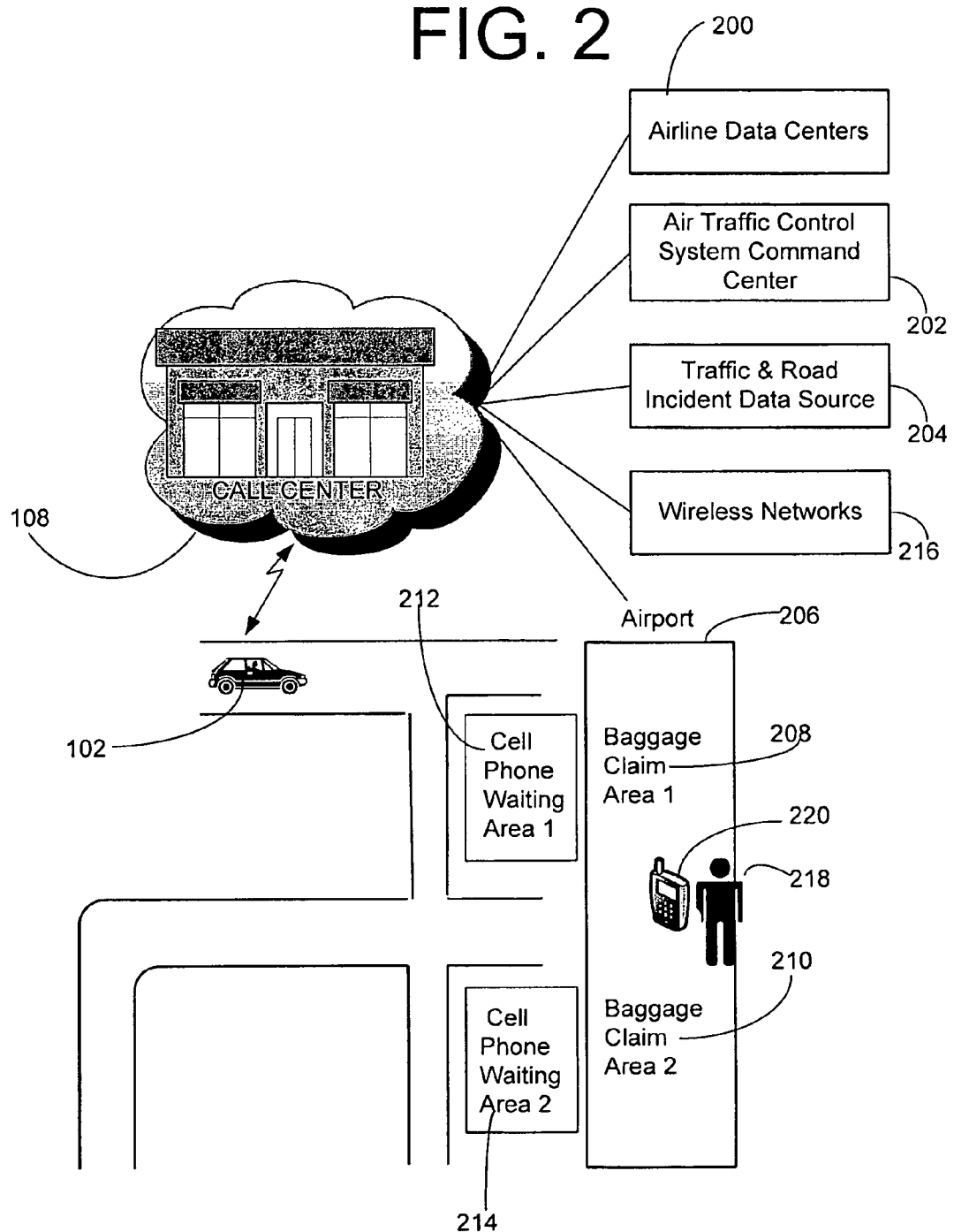
FIG. 2 is a schematic diagram illustrating a passenger pickup synchronization system utilizing the telematics functionality of FIG. 1 with reference to an airline passenger arrival environment, in accordance with an example of the invention.

Referring to FIG. 2, a passenger pickup synchronization system utilizing the telematics functionality of FIG. 1 is shown with reference to an airline passenger arrival environment. Those skilled in the art will realize, however, that the following description is not limited to airline passenger pickup synchronization and may be employed in a variety of other contexts where telematic routing and meeting place synchronization is appropriate between an automobile telematics unit and a location-aware mobile device, between two or more automobile telematics units, between two or more location-aware mobile devices, or any combination thereof. Exemplary scenarios include, but are not limited to, rental car passenger pickup, train passenger pickup, as well as other contexts involving meeting place synchronization via telematic routing.

As illustrated in FIG. 2, the call center 108 accepts one or more data feeds in order to synchronize expected passenger arrival and location with pickup vehicle routing. The data feeds include plane arrival and departure times, airport delays, baggage delays, baggage delivery locations, roadway traffic delays, road incident location data, waiting area availability, as well as passenger location data. In one example, the call center 108 communicates with a plurality of airline data centers 200 to receive airline-specific flight arrival, departure, and delay information. Alternatively or in addition, the call center 108 communicates with an Air Traffic Control System Command Center 202 operated by the Federal Aviation Administration (FAA) for receiving real-time airport delay data. To provide enhanced routing of the vehicle 102, the call center 108 also processes roadway traffic delay and incident information received from a plurality of on-the-road probe vehicles or from an external traffic and road incident data provider 204. Preferably, the call center 108 further communicates with one or more airports 206 for receiving baggage delay information, information related to the location of each baggage claim area 208-210 and respective cell phone waiting areas 212-214, as well as data indicative of cell phone area availability (e.g., number of available parking spaces). Additionally, the call center 108 communicates with a plurality of wireless networks 216 for exchanging location data (e.g., latitude and longitude) of passenger 218 and vehicle 102 via a location-aware mobile device 220 and telematics unit 114 respectively. Wireless networks 216 include a mobile telephone network (e.g., CDMA, GSM, EDGE, EVDO, or UMTS-based networks), an airport or other local Wi-Fi network, a short-range Bluetooth network connection, or any suitable wireless network connection in vicinity of the airport facility 206, including any networks operating within the unlicensed FCC Part 15 spectrum.

Thus, in one example, when the vehicle 102 requests routing information to an airport 206, the telematics unit 114 prompts the user for passenger arrival data, including an airport, airline, and flight information, and transmits collected data to the call center 108. The call center 108, in turn, optimizes the routing directions transmitted back to the vehicle 102 for synchronization with passenger arrival based on the location of a baggage claim area assigned to the passenger's flight number, airport and surrounding roadway traffic conditions, and geographical location of the passenger 218 within the airport facility 206. Preferably, the call center 108 notifies the telematics unit 114 regarding the passenger's arrival and assigned baggage claim area and routes the vehicle 102 to the most available cell phone waiting area 212-214 based on the local traffic conditions, local roadway incident data, cell phone waiting area availability data received from the airport 206, and current location of the passenger 218. Alternatively, the call center 108 routes the vehicle 102 to the waiting area closest to the baggage claim area assigned to the passenger's flight number. Preferably, the call center 108 also communicates the waiting area 212-214 in which the vehicle 102 is located to the passenger's mobile device 220 via a wireless network 216. Examples of the mobile device 220 include a mobile telephone, a wireless network-enabled personal digital assistant (PDA), or the like.

Figure 3:
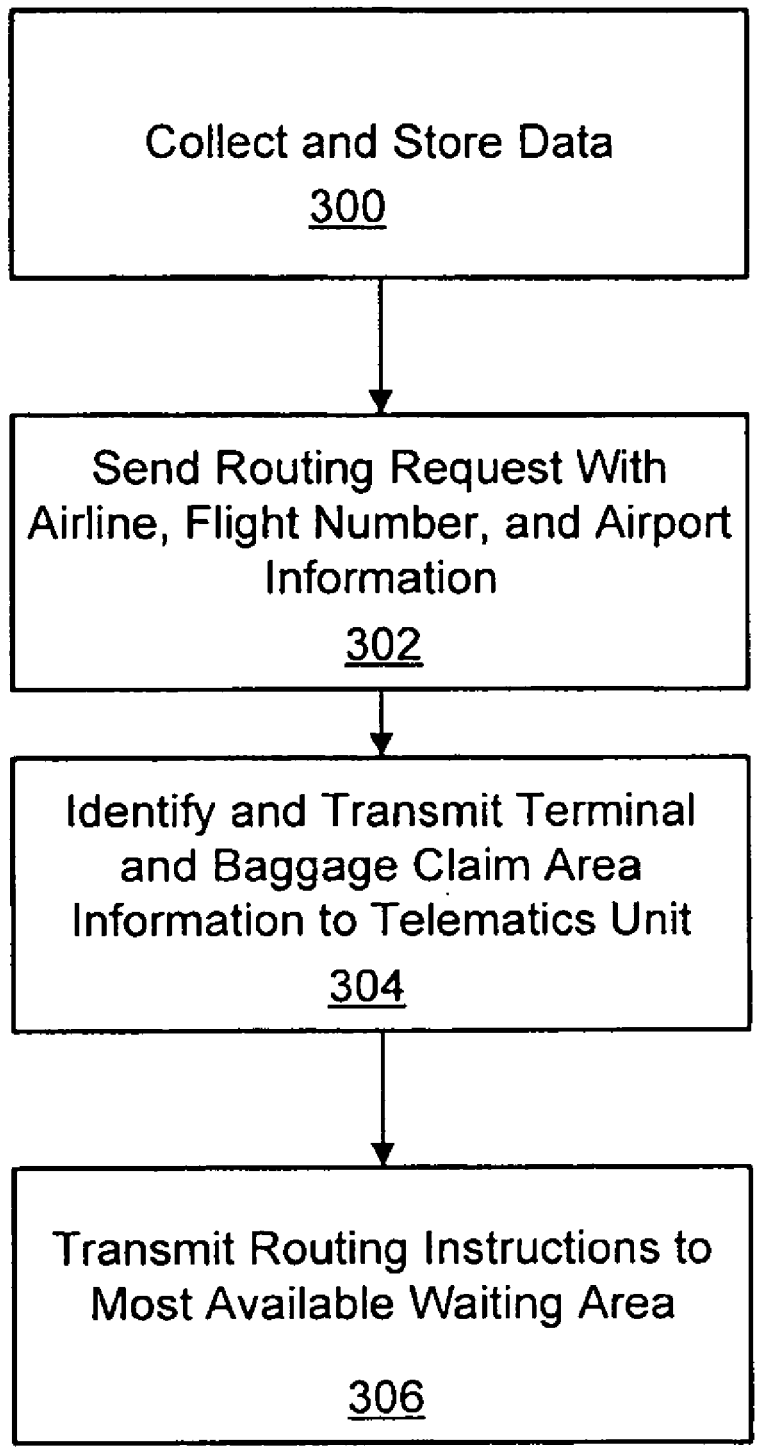
FIG. 3 is a flow chart illustrating a method for synchronizing passenger pickup via telematic routing, in accordance with an example of the invention.

Referring to FIG. 3, an example of a method for synchronizing passenger pickup via telematic routing is shown. In step 300, the call center 108 collects and stores information from airline data centers 200, traffic and road incident data source 204, airport facility 206, and one or more wireless networks 216. In one example, the call center continuously collects information from data sources 200, 204-206, and 216. In another example, the call center initiates the data collection of step 300 pursuant to a routing request from the telematics unit 114. In step 302, the call center 108 receives passenger-specific airline, flight number, and destination airport data based on an input via the user interface at the telematics unit 114 and sends a routing request with this information to the call center 108. In step, 304, the call center 108 identifies the terminal and baggage claim area assigned to the passenger 218 (e.g., based on data received from the airport 206 and/or the airline data centers 200) and transmits this information to the telematics unit 114 for display via the user interface at the vehicle 102. In one example, the telematics unit 114 periodically requests an update of the assigned terminal and baggage claim area from the call center 108, such as when the passenger's flight has not yet landed and/or when the vehicle 102 is in close proximity to the airport 206. In step 306, the call center 108 transmits vehicle routing instructions to the telematics unit 114 to guide the vehicle 102 to the most available cell phone waiting area 212-214 based on one or more of the following factors: assigned terminal and baggage claim area 208-210, availability of temporary parking spaces at the most proximate cell phone waiting area 212-214, local traffic and road incident conditions, reported baggage claim processing delay, as well as proximity of the vehicle 102 to the assigned baggage claim area. For example, when a cell phone waiting area 212, which is most proximate to the assigned baggage claim area 208, lacks available parking space, or when reported traffic conditions around the waiting area 212 indicate a prolonged delay prior to passenger pickup, the call center 108 re-routes the vehicle 102 to the next proximate cell phone waiting area 214 if it is likely to speed up passenger pickup time. Preferably, the call center 108 notifies the telematics unit 114 when the passenger's flight has arrived and when the passenger is in proximity to the assigned baggage claim area. Likewise, in step 308, upon arrival of the vehicle 102, the call center 108 notifies the passenger 218 of the cell phone waiting area 212-214 in which the vehicle 102 is waiting to meet the passenger.

Figure 4:
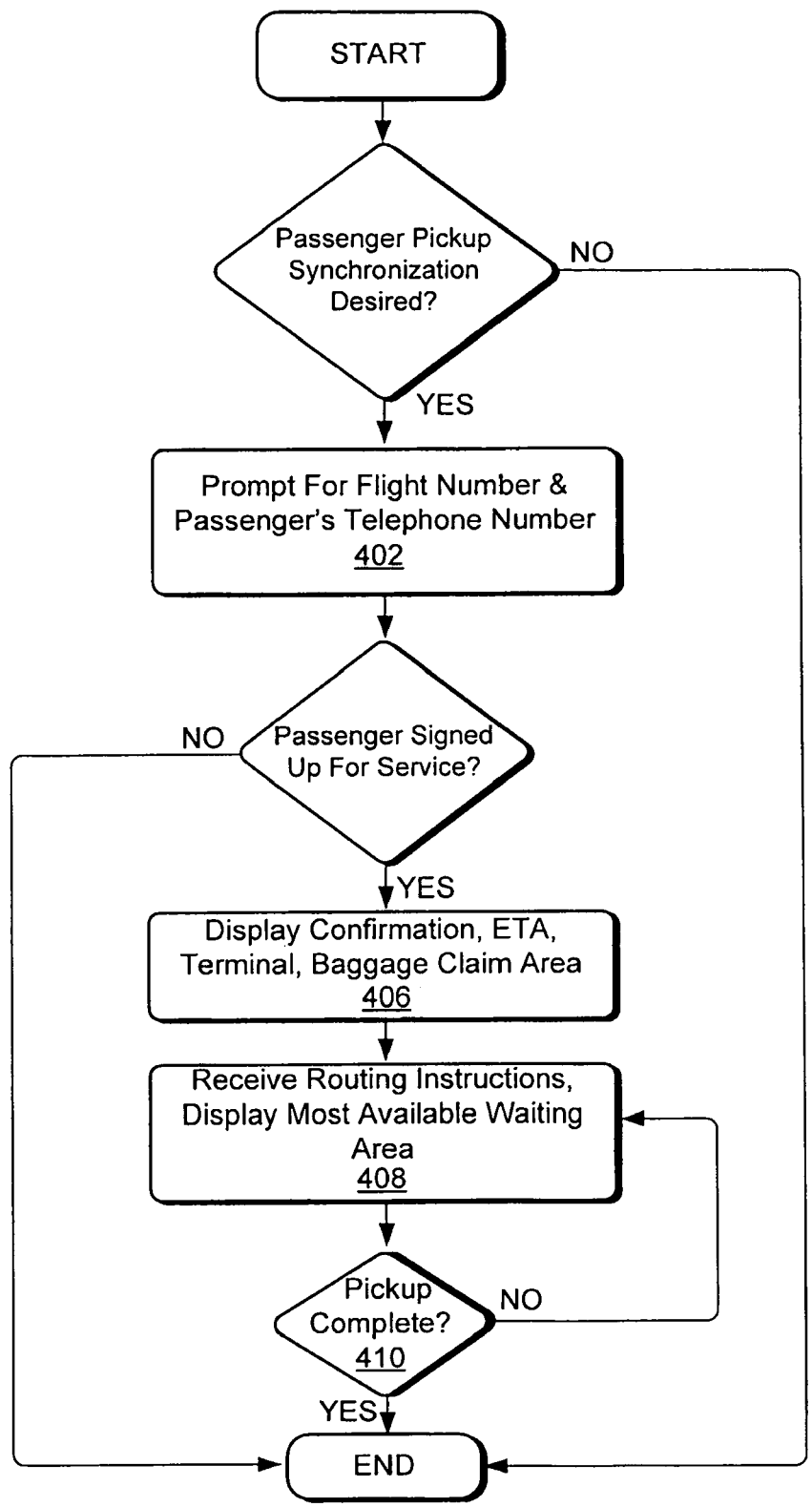
FIG. 4 is a flow chart illustrating a method for notifying a telematics-capable vehicle of passenger arrival time and location.

Referring to FIG. 4, a method for notifying a telematics-capable vehicle 102 of passenger arrival time and location is shown. In step 400, the telematics unit 114 prompts the user whether passenger pickup synchronization service is desired when the user requests routing instructions to a location corresponding to an airport 206. If so, the telematics unit 114 prompts the user to enter the passenger's flight and telephone numbers, step 402. If the passenger has signed up for the pickup synchronization service, the call center 108 sends a confirmation to the telematics unit 114, along with an estimated time of arrival of the passenger, as well as the assigned airport terminal and baggage claim area for displaying to the vehicle occupants, step 404. Next, as discussed FIG. 3 above, the call center 108 sends routing instructions to the telematics unit 114 and identifies the most available cell phone waiting area, step 406. When the vehicle is parked at the identified cell phone waiting area, the call center 108 sends out an appropriate notification to the passenger's mobile device 220. In step 408, the telematics unit 114 prompts the user whether passenger pickup is complete and, if so, ends the routing session.

All references, including publications, patent applications, and patents, cited herein are hereby incorporated by reference to the same extent as if each reference were individually and specifically indicated to be incorporated by reference and were set forth in its entirety herein.

The use of the terms "a" and "an" and "the" and similar referents in the context of describing the invention (especially in the context of the following claims) are to be construed to cover both the singular and the plural, unless otherwise indicated herein or clearly contradicted by context. The terms "comprising," "having," "including," and "containing" are to be construed as open-ended terms (i.e., meaning "including, but not limited to,") unless otherwise noted. Recitation of ranges of values herein are merely intended to serve as a shorthand method of referring individually to each separate value falling within the range, unless otherwise indicated herein, and each separate value is incorporated into the specification as if it were individually recited herein. All methods described herein can be performed in any suitable order unless otherwise indicated herein or otherwise clearly contradicted by context. The use of any and all examples, or exemplary language (e.g., "such as") provided herein, is intended merely to better illuminate the invention and does not pose a limitation on the scope of the invention unless otherwise claimed. No language in the specification should be construed as indicating any non-claimed element as essential to the practice of the invention.

Examples of this invention are described herein, including the best mode known to the inventors for carrying out the invention. Variations of those examples may become apparent to those of ordinary skill in the art upon reading the foregoing description. The inventors expect skilled artisans to employ such variations as appropriate, and the inventors intend for the invention to be practiced otherwise than as specifically described herein. Accordingly, this invention includes all modifications and equivalents of the subject matter recited in the claims appended hereto as permitted by applicable law. Moreover, any combination of the above-described elements in all possible variations thereof is encompassed by the invention unless otherwise indicated herein or otherwise clearly contradicted by context.

What is claimed is:

1. An automated system for facilitating passenger pickup via automatic telematic routing, the system comprising:
    a call center having therein a computer system and database adapted to receive and integrate a plurality of data feeds including data feeds indicative of passenger arrival time at an airport and location, airport waiting area conditions, local traffic incidents and conditions, passenger waiting area availability, passenger baggage claim location, baggage claim delay associated with the baggage claim location, passenger flight arrival time, roadway traffic, and roadway incidents between the vehicle location and the airport, the integrating of the plurality of data feeds producing a recommended pick-up location and recommended travel directions to the recommended pick-up location, the call center computer system being further adapted to transmit the recommended pick-up location and recommended travel directions to a vehicle telematics unit installed in a remote vehicle;
    a mobile wireless communications device associated with the passenger, the mobile device in communication with the call center via one or more wireless networks adapted to receive an indicator of the recommended meeting location, wherein the call center computer system is further adapted access data associated with the communications device and to transmit an indication of the recommended meeting location to the communications device.

2. The system of claim 1 wherein the call center is adapted to determine the recommended meeting location based on vehicle location and the plurality of indicators.

3. The system of claim 1 wherein the recommended meeting location is an airport vehicle waiting area.

4. The system of claim 1 wherein the communications device is a mobile telephone.

5. The system of claim 1 wherein the communications device is a personal digital assistant.

6. The system of claim 1 wherein the call center computer system is further adapted to re-route the vehicle to a next proximate passenger meeting location when a recommended meeting location is not available.

7. A method for synchronizing passenger pickup via telematic routing, the method comprising:
    receiving a plurality of electronic data feeds indicative of passenger arrival time at the airport, passenger location, airport waiting area conditions, local traffic incidents and conditions, passenger waiting area availability, passenger baggage claim location, baggage claim delay associated with the baggage claim location, passenger flight arrival time at an airport, roadway traffic, and roadway incidents between the vehicle location and the airport;
    electronically integrating, by a processor, the plurality of data feeds to generate a recommended pick-up location and recommended travel instructions from the vehicle location to the recommended pick-up location;
    automatically sending the recommended travel instructions wirelessly to the vehicle to guide the vehicle to the recommended pick-up location; and
    wirelessly and automatically sending an indicator of the recommended pick-up location to a mobile device associated with the passenger.

8. The method of claim 7 further comprising determining the recommended pick-up location based on vehicle location and the plurality of indicators.

9. The method of claim 7 wherein the recommended pick-up location is an airport vehicle waiting area.

10. The method of claim 7 wherein the mobile device is a mobile telephone.

11. The method of claim 7 wherein the mobile device is a personal digital assistant.

12. The method of claim 7 further comprising re-routing the vehicle to a next proximate pick-up location when the recommended pick-up location is not available.

13. The method of claim 7 further comprising sending the indicator of the recommended pick-up location to the mobile device when the vehicle is at the recommended pick-up location.

* * * * *